US009899948B2

United States Patent
Butzmann et al.

(10) Patent No.: US 9,899,948 B2
(45) Date of Patent: Feb. 20, 2018

(54) ELECTRIC DRIVE SYSTEM

(71) Applicant: Robert Bosch GmbH, Stuttgart (DE)

(72) Inventors: Stefan Butzmann, Schalksmühle (DE); Martin Braun, Neustetten-Wolfenhausen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/119,760

(22) PCT Filed: Jan. 8, 2015

(86) PCT No.: PCT/EP2015/050216
§ 371 (c)(1),
(2) Date: Aug. 18, 2016

(87) PCT Pub. No.: WO2015/128103
PCT Pub. Date: Sep. 3, 2015

(65) Prior Publication Data
US 2017/0070175 A1   Mar. 9, 2017

(30) Foreign Application Priority Data

Feb. 27, 2014   (DE) .................. 10 2014 203 553

(51) Int. Cl.
H02P 1/00       (2006.01)
H02P 27/06      (2006.01)
(Continued)

(52) U.S. Cl.
CPC .......... H02P 27/06 (2013.01); B60L 11/1803 (2013.01); B60L 11/1864 (2013.01);
(Continued)

(58) Field of Classification Search
CPC ...... H02J 7/022; H02J 2007/0067; H02J 1/06; H02J 2001/006; H02J 7/0063; H02J 7/32;
(Continued)

(56) References Cited

U.S. PATENT DOCUMENTS 4,467,407 A * 8/1984 Asano .................. H02M 7/487
                                                  363/43
4,624,334 A * 11/1986 Kelledes ................ B62D 5/046
                                                  180/446
(Continued)

FOREIGN PATENT DOCUMENTS

CN      101409498 A     4/2009
CN      102263469 A     11/2011
(Continued)

OTHER PUBLICATIONS

International Search Report for Application No. PCT/EP2015/050216 dated Apr. 28, 2015 (English Translation, 3 pages).

*Primary Examiner* — Paul Ip
(74) *Attorney, Agent, or Firm* — Michael Best & Friedrich LLP

(57) ABSTRACT

The invention relates to an electric drive system with an n-phase electric machine, n>1, having at least two multiphase winding strands; a first inverter, the output connections of which are connected to the phase connections of a first of the multiphase winding strands of the electric machine; a second inverter, which is connected in parallel to the first inverter and the output connections of which are connected to the phase connections of a second of the multiphase winding strands of the electric machine; and a DC voltage source, which has a plurality of battery modules connected in series and a first output connection of which is connected to a first input connection of the first inverter and second output connection of which is connected to a first input connection of the second inverter. A second input connection of the first inverter and a second input connection of the second inverter are connected to each other such that the first inverter and the second inverter are arranged in a series circuit, and the second input connection of the first inverter and the second input connection of the second
(Continued)

inverter are connected to a center tap of the DC voltage source between two sub-groups of the battery modules connected in series.

12 Claims, 3 Drawing Sheets

(51) Int. Cl.
| | | |
|---|---|---|
| *B60L 11/18* | (2006.01) | |
| *H02P 25/22* | (2006.01) | |
| *H02M 7/00* | (2006.01) | |
| *H02M 7/493* | (2007.01) | |
| *H02M 7/5387* | (2007.01) | |
| *B60L 15/00* | (2006.01) | |
| *H02M 1/14* | (2006.01) | |
| *H02M 1/00* | (2006.01) | |

(52) U.S. Cl.
CPC .............. *B60L 15/007* (2013.01); *H02M 1/14* (2013.01); *H02M 7/003* (2013.01); *H02M 7/493* (2013.01); *H02M 7/5387* (2013.01); *H02M 7/53871* (2013.01); *H02P 25/22* (2013.01); *B60L 2200/32* (2013.01); *B60L 2220/12* (2013.01); *B60L 2220/14* (2013.01); *B60L 2220/16* (2013.01); *B60L 2220/18* (2013.01); *B60L 2220/58* (2013.01); *H02M 2001/0074* (2013.01); *Y02T 10/641* (2013.01); *Y02T 10/644* (2013.01); *Y02T 10/645* (2013.01); *Y02T 10/7005* (2013.01); *Y02T 10/7061* (2013.01)

(58) Field of Classification Search
CPC .......... H02P 25/22; H02P 23/00; H02P 27/14; H02P 6/28; H02P 27/06; H02P 4/00; H02P 6/14; H02P 9/00; H02P 9/08
USPC ................... 318/139, 801; 363/131, 132, 43
See application file for complete search history.

(56) References Cited

U.S. PATENT DOCUMENTS

| | | | | |
|---|---|---|---|---|
| 4,996,637 | A * | 2/1991 | Piechnick ................. | H02J 7/32 307/43 |
| 5,016,158 | A * | 5/1991 | Matsui ..................... | H02M 7/49 363/40 |
| 5,166,578 | A * | 11/1992 | Nilssen .............. | H02M 7/53832 315/209 R |
| 5,446,346 | A * | 8/1995 | Nilssen .............. | H02M 7/53832 315/209 R |
| 5,642,273 | A * | 6/1997 | Lai .......................... | H02M 1/34 363/132 |
| 5,710,698 | A * | 1/1998 | Lai .......................... | H02M 1/34 363/132 |
| 6,728,120 | B1 | 4/2004 | Greif et al. | |
| 6,882,061 | B1 * | 4/2005 | Ashtiani ............... | H02J 7/0063 219/209 |
| 7,834,579 | B2 * | 11/2010 | Nojima ................. | H02M 7/487 318/254.2 |
| 8,013,553 | B2 * | 9/2011 | Taniguchi ............ | B60L 1/003 318/400.27 |
| 8,649,197 | B2 * | 2/2014 | Abe ...................... | H02M 7/487 363/132 |
| 8,867,248 | B2 * | 10/2014 | Wang .................... | H02M 7/487 363/132 |
| 8,934,276 | B2 * | 1/2015 | Teo ........................ | H02M 7/487 363/131 |
| 8,937,400 | B2 * | 1/2015 | Obayashi ................ | B60L 1/003 180/65.21 |
| 9,083,230 | B2 * | 7/2015 | Narimani ............... | H02M 3/07 |
| 9,203,336 | B2 * | 12/2015 | Butzmann ............. | H02M 7/483 |
| 9,431,932 | B2 * | 8/2016 | Schmidt .................. | H02M 7/49 |
| 2005/0127853 | A1 * | 6/2005 | Su .......................... | H02M 7/487 318/108 |
| 2006/0197491 | A1 * | 9/2006 | Nojima ................. | H02M 7/487 318/801 |
| 2007/0070667 | A1 | 3/2007 | Stancu et al. | |
| 2008/0246429 | A1 | 10/2008 | Atarashi et al. | |
| 2009/0033274 | A1 * | 2/2009 | Perisic ............... | B60L 11/1868 318/771 |
| 2009/0128076 | A1 * | 5/2009 | Taniguchi ............ | B60L 1/003 318/400.41 |
| 2009/0171521 | A1 * | 7/2009 | Moki ...................... | B60L 11/18 701/22 |
| 2011/0011658 | A1 * | 1/2011 | Takizawa .............. | B60L 3/0092 180/65.31 |
| 2011/0260531 | A1 * | 10/2011 | Obayashi .............. | B60L 1/003 307/10.1 |
| 2012/0057380 | A1 * | 3/2012 | Abe ...................... | H02M 7/487 363/62 |
| 2012/0239869 | A1 | 9/2012 | Chiueh et al. | |
| 2012/0256568 | A1 | 10/2012 | Lee | |
| 2013/0002172 | A1 * | 1/2013 | Toda ...................... | B60L 3/003 318/51 |
| 2013/0049650 | A1 * | 2/2013 | Kurfiss .................... | B60L 7/14 318/139 |
| 2013/0286704 | A1 * | 10/2013 | Liu ........................ | H02M 1/12 363/132 |
| 2014/0016382 | A1 * | 1/2014 | Teo ........................ | H02M 7/487 363/123 |
| 2014/0036557 | A1 * | 2/2014 | Nondahl ................ | H02M 1/12 363/71 |
| 2014/0050000 | A1 * | 2/2014 | Teo ........................ | H02M 7/487 363/131 |
| 2014/0111123 | A1 * | 4/2014 | Butzmann ............. | H02M 7/483 318/139 |
| 2014/0241016 | A1 * | 8/2014 | Ho ......................... | H02M 7/493 363/40 |
| 2014/0307497 | A1 * | 10/2014 | Yoo ....................... | H02M 7/483 363/131 |
| 2014/0362620 | A1 * | 12/2014 | Yoo ....................... | H02M 7/483 363/37 |
| 2014/0368132 | A1 * | 12/2014 | Schmidt ................. | H02M 7/49 318/139 |
| 2014/0376287 | A1 * | 12/2014 | Narimani ............... | H02M 3/07 363/60 |
| 2015/0070947 | A1 * | 3/2015 | Heikkila ................ | H02M 1/44 363/40 |
| 2015/0194902 | A1 * | 7/2015 | Tian ...................... | H02M 5/458 363/37 |
| 2015/0200602 | A1 * | 7/2015 | Narimani ............. | H02M 5/4585 363/37 |

FOREIGN PATENT DOCUMENTS

| | | |
|---|---|---|
| DE | 19524985 | 8/1996 |
| DE | 19926979 | 1/2001 |
| DE | 102008008978 | 3/2009 |
| DE | 102010001250 | 7/2011 |
| DE | 102011085731 | 5/2013 |
| DE | 102012203525 A1 | 9/2013 |
| EP | 0947377 | 10/1999 |
| WO | 2006131210 | 12/2006 |
| WO | 2012016062 | 2/2012 |

* cited by examiner

ELECTRIC DRIVE SYSTEM

BACKGROUND OF THE INVENTION

The invention relates to an electric drive system, in particular for an electrically operated vehicle such as an electric car or a hybrid vehicle.

As is depicted in FIG. 1 by way of example, multiphase current is fed in an electric drive system 100 into an electric machine 101 typically by means of an inverter 102 in the form of a pulse width modulated inverter. To this end, a DC voltage provided by a DC voltage intermediate circuit 103 can be converted into a multiphase AC voltage, for example a three-phase AC voltage. The DC voltage intermediate circuit 103 is fed by a string consisting of series-connected battery modules 105 or any desired DC voltage sources.

In order to be able to meet the requirements for power and energy given for a respective application, a plurality of battery modules or battery cells are frequently connected in series in an energy storage system. If however high power outputs are required from the electric machine, it may be necessary to take measures in implementing the electric drive system 100 that meet the increased power output requirements.

It can, for example, be possible to connect a plurality of strings 104 consisting of series-connected battery modules 105 in parallel. This can however lead to undesired compensation currents between the strings 104.

In addition, it may also be necessary to increase the current carrying capacity of the components of the inverter 102 and the electric machine 101. Alternatively, the intermediate circuit voltage could also be raised. In any case, extensive adaptations and changes in the implementation of the electric drive system will be necessary, which in turn lead to increased implementation effort and costs.

The American patent publication US 2007/0070667 discloses a drive system for an electrically operated vehicle comprising multiple inverters connected in parallel, which supply AC voltage to a multiphase motor. The German patent publication DE 10 2011 085 731 A1 discloses an electric drive system for a six-phase motor comprising two inverters connected in parallel. The German patent publication DE 10 2008 008 978 A1 discloses modular drive converters. The German patent publication DE 10 2010 001 250 A1 discloses an electric drive system for an electric machine comprising two phase systems, which are fed via separate inverters.

SUMMARY OF THE INVENTION

According to a first aspect, the present invention relates to an electric drive system, comprising an n-phase electric machine, n>1, which has at least two multiphase winding strands, a first inverter, the output connections of which are connected to the phase connections of a first of the multiphase wiring strands of the electric machine, a second inverter, which is connected in parallel to the first inverter and the output connections of which are connected to the phase connections of a second of the multiphase winding strands of the electric machine, and a DC voltage source, which has a plurality of battery modules connected in series and a first output connection of which is connected to a first input connection of the first inverter and a second output connection of which is connected to a first input connection of the second inverter. A second input connection of the first inverter and a second input connection of the second inverter are connected to each another such that the first inverter and the second inverter are arranged in a series circuit, and the second input connection of the first inverter and the second input connection of the second inverter are connected to a center tap of the DC voltage source between two sub-groups of the battery modules connected in series.

A concept of the present invention is to actuate electric machines with the help of standardized power modules, such as inverters, for example in B6 topology. Such inverters are available as standardized module types which can be cost effectively procured and implemented by means of economy of scale effects. The performance of the electric drive system is advantageously increased by the modularization of the power modules without the design of the electric machine or the individual power modules being more complicated or cost intensive per se. Simple mechanical connection means, by means of which the system modules can be interconnected, can furthermore be provided for all of the power modules. In addition, a central control device, for example on a central control circuit board, can be similarly provided for all power modules.

According to one embodiment of the electric drive system according to the invention, the first and the second inverter can each have a three-phase, self-piloted inverter which comprises three symmetrical half bridges consisting in each case of two power semiconductor switches connected in series.

According to a further embodiment of the electric drive system according to the invention, the switching elements can each comprise power semiconductor switches, preferably MOSFET switches or IGBT switches. These switches are particularly able to withstand stress and can be reliably actuated.

According to a further embodiment of the electric drive system according to the invention, the drive system can furthermore comprise a control device which is designed to actuate the power semiconductor switches of the first inverter and the second inverter, wherein the control device is disposed on a central control circuit board for the first inverter and the second inverter.

According to a further embodiment of the electric drive system according to the invention, the drive system can furthermore comprise at least one third inverter, which is connected in parallel to the first inverter and the input connections of which are each coupled to the input connections of the first inverter, and at least one fourth inverter, which is connected in parallel to the second inverter and the input connections of which are each coupled to the input connections of the second inverter. According to a further embodiment, the drive system can in this case furthermore comprise a third DC voltage intermediate circuit, which is coupled between the input connections of the third inverter, and a fourth DC voltage intermediate circuit, which is coupled between the input connections of the fourth inverter.

BRIEF DESCRIPTION OF THE DRAWINGS

Further features and advantages of embodiments of the invention ensue from the following description with reference to the attached drawings.

In the drawings.

Identical reference signs generally denote similar or similarly functioning components. The schematic depictions shown in the figures are only of an exemplary nature and are depicted in an idealized manner for reasons of clarity. It goes without saying that the depicted components are only used to illustrate principles and functional aspects of the present invention.

DETAILED DESCRIPTION

Figure 1:
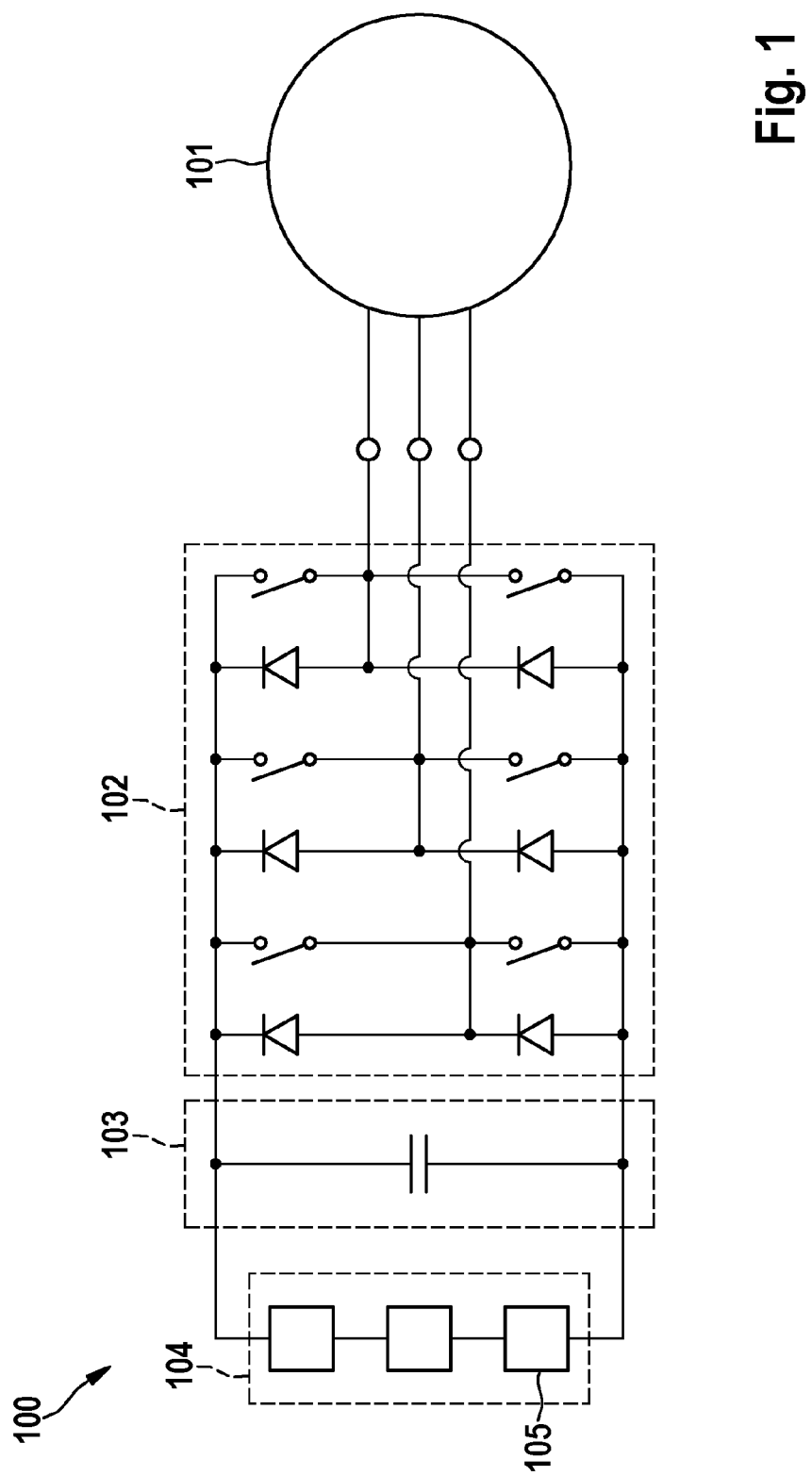
FIG. 1 shows a schematic depiction of an exemplary conventional electric drive system.
Figure 2:
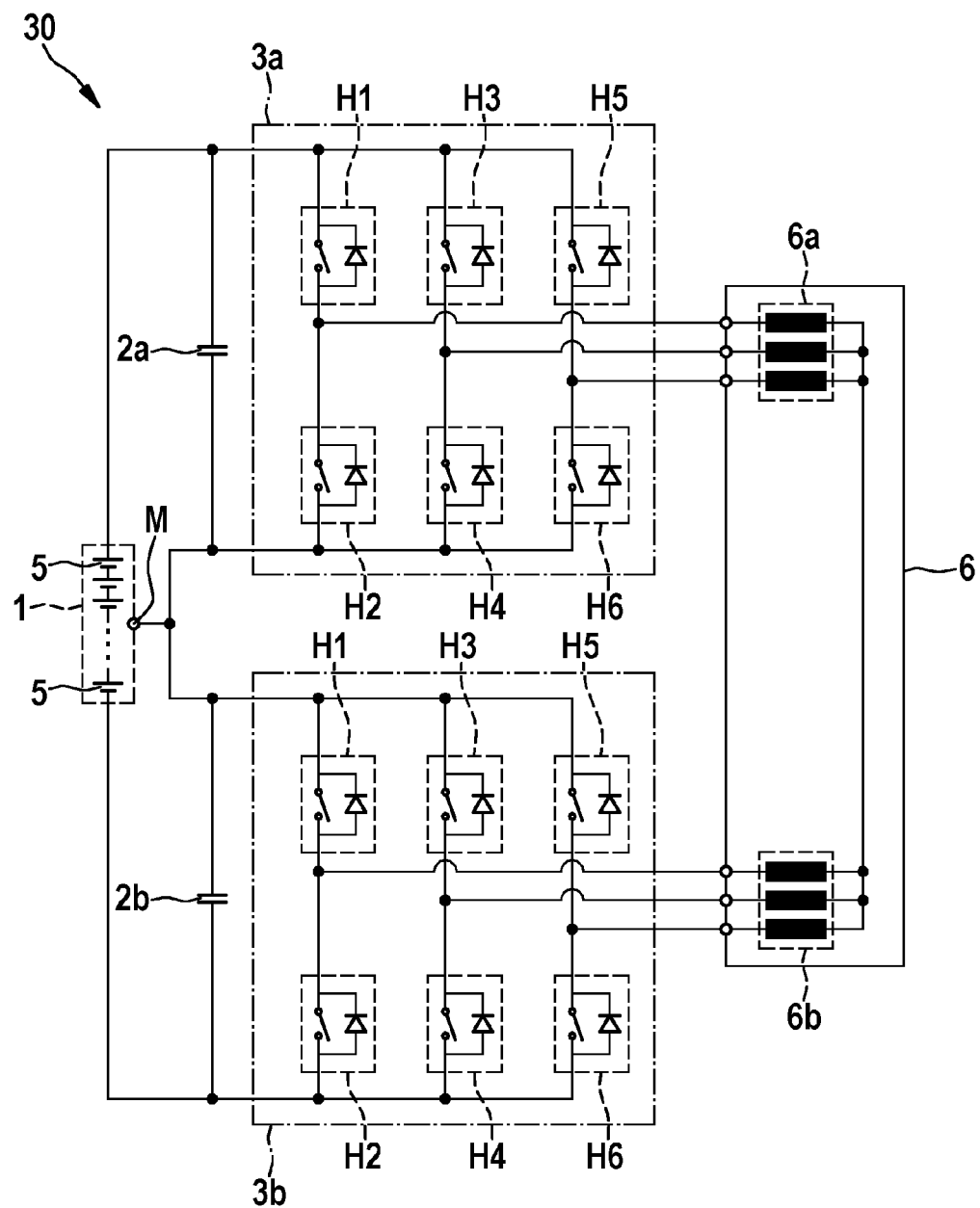
FIG. 2 shows a schematic depiction of an electric drive system according to a further embodiment of the present invention.

FIG. 2 shows a schematic depiction of an electric drive system 30, comprising a six-phase electric machine 6, which, for example, can be a switched reluctance machine or a three-phase machine. The electric machine 6 has, by way of example, two three-phase wiring strands 6a and 6b, which can be coupled to one another at the neutral point thereof. The electric drive system 30 furthermore has an inverter system consisting of at least one first inverter 3a and a second inverter 3b. In so doing, the first inverter 3a, at the output connections thereof, feeds the first three-phase winding strand 6a of the electric machine 6. The second inverter 3b feeds, at the output connections thereof, the second three-phase winding strand 6b of the electric machine 6.

The inverters 3a and 3b each have a B6 full-bridge topology, i.e. each of the inverters represents a three-phase, self-piloted inverter which comprises three symmetrical half bridges consisting respectively of two power semiconductor switches H1 and H2, H3 and H4 or respectively H5 and H6 in a series circuit. The power semiconductor switches can, for example, be MOSFET switches or IGBT switches. It is, however, also thereby possible to use any other type of switching elements as switches H1 to H6 and at the same time to connect a free-wheeling diode in parallel to each switching element H1 to H6. A first of the phases of the three-phase winding strands 6a or 6b is coupled to a center tap of a first half bridge of the inverters 3a or respectively 3b. A second of the phases of the three-phase winding strands 6a or respectively 6b is connected to a center tap of a second half bridge of the inverter 3a or respectively 3b; and a third of the phases of the three-phase winding strands 6a or respectively 6b is connected to a center tap of a third half bridge of the inverters 3a or respectively 3b.

The first inverter 3a and the second inverter 3b can thereby be implemented either as separate inverter units or also in a common inverter module. In the latter case, a single inverter module comprising six symmetrical half bridges can be provided which is coupled in a suitable manner to the electric machine 6. A (not explicitly depicted) control device, which, for example, can be implemented on a common control circuit board, can be used for the actuation of the power semiconductor switches H1 to H6.

The inverters 3a and 3b can, for example, be supplied with electrical energy from a DC voltage intermediate circuit 2a or respectively 2b. In the electric drive system 30, a common DC voltage source 1, for example a traction battery of an electric vehicle, is provided to supply both DC voltage intermediate circuits 2a and 2b with electrical DC voltage. To this end, the DC voltage source 1 can, for example, comprise a series circuit consisting of battery modules 5, the number of which is depicted as 3 in FIG. 2 only by way of example. Any other number of battery modules 5 can likewise be possible. It is furthermore clear that even the number of the phases of the inverters 3a and 3b can deviate from the exemplary number of three shown in FIG. 2 depending on the required number of the phases of the winding strands 6a and 6b of the electric machine 6, the phase number of which can assume any desired number. It is likewise possible to connect more than two inverters 3a and 3b in parallel, in particular if the electric machine 6 has more than two multiphase winding strands 6a and 6b. To this end, each of the inverters can be associated with one of the multiphase winding strands and be electrically connected to the same.

The DC voltage source 1 is connected by means of respectively one of the two output connections thereof to respectively one input connection of the two inverters 3a and 3b. The respective other input connections of the two inverters 3a and 3b are connected to a center tap M of the DC voltage source 1. In so doing, the center tap M is coupled between respectively two sub-groups of battery modules 5 of the DC voltage source 1 in the series circuit of the battery modules 5 in order to provide a fixed reference potential for the input connections of the two inverters 3a and 3b. If more than two inverters 3a and 3b are used, a plurality of center taps M can also be implemented, which are designed in such a way that the entire output voltage of all of the battery modules 5 is divided up by the number of inverters connected in series. As a result, a symmetry of the respective reference potentials can be achieved for the input connections of the inverters.

Each inverter 3a, 3b can also be fed by a separate DC voltage source 1. For example, a feed of a six-phase electric machine 6, as depicted in FIG. 2, can also be carried out by two separate DC voltage sources 1. In an advantageous manner, adjacent inverters 3a, 3b can in each case be alternately fed by both DC voltage sources 1 in this variant.

By connecting basically similar inverters 3a and 3b in series, the performance of the electric drive system 30 can be significantly increased while maintaining the desired output voltage level. The average voltage level between the two inverters 3a and 3b can thereby be balanced in a suitable manner by means of the selection of the center tap M. As a result, the current carrying capacity of the power semiconductor switches H1 to H6 of the inverters H1 to H6 does not have to be increased with respect to conventional power semiconductor switches H1 to H6. In addition, a redundant system can be created by the modularization, in which an emergency operating function having limited performance capability can be set up in the event of a fault in an individual inverter 3a or respectively 3b. To this end, the defective or faulty part of the inverter system can be deactivated and be bridged or respectively bypassed by means of suitable bypass switches in the series circuit of the inverter; and the electric machine 6 is at least temporarily supplied with energy by the remaining inverter parts at a reduced performance level.

Figure 3:
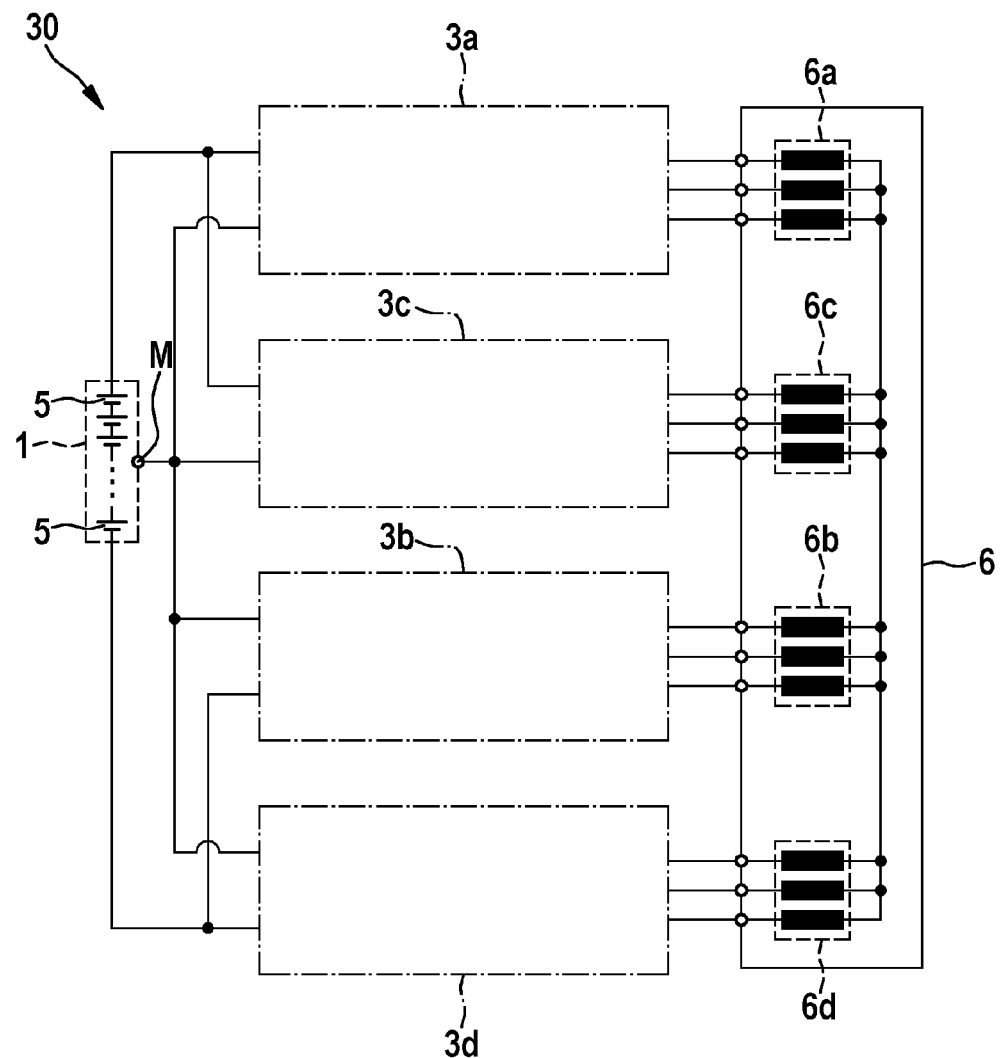
FIG. 3 shows a schematic depiction of an electric drive system according to a further embodiment of the present invention.

FIG. 3 shows a modification to the electric drive system 30 of FIG. 2. In FIG. 3, two or more inverters 3a and 3c or respectively 3b and 3d in each of the inverter subsystems of the inverter system, said inverter subsystems being connected in series, can be connected in parallel. As a result, a plurality of inverters 3a and 3c or respectively 3b and 3d can be implemented per voltage level, wherein said inverters can, for example, be clocked in an offset manner, in order to reduce voltage and/or current fluctuations ("ripples") in the phase voltages or respectively in the phase currents which are fed into the electric machine. Furthermore, each of the inverters 3a, 3b, 3c and 3d feeds a three-phase winding strand 6a, 6b, 6c, 6d of the electric machine. In the example of FIG. 3, the electric machine 6 is therefore a twelve-phase machine.

The number of the voltage levels as well as the number of the inverters 3a and 3c or respectively 3b and 3d per voltage level are shown in FIG. 3, only by way of example, to be two in each case. It is readily possible to implement more than two voltage levels or respectively more than two inverters per voltage level. In the case of more than two voltage levels, an additional center tap M of the DC voltage source 1 between two further sub-groups of the battery modules 5 can be used in order to balance the voltage intermediate levels between the input connections of the individual inverter groups per voltage level, said input connections being connected in each case in series.

The individual inverters 3a and 3c or respectively 3b and 3d have to only be designed for a fraction of the total DC voltage of the DC voltage source 1 depending on the number of voltage intermediate levels used. As a result, standard power modules can also be used for high output voltages of the DC voltage source 1.

In the drive system 30 depicted in FIGS. 2 and 3, the electric machine 6 can, for example, be a synchronous or asynchronous machine, a reluctance machine or a brushless DC motor (BLDC). It may also be possible to use the electric drive system 30 of FIGS. 2 and 3 in stationary systems, for example in power plants, in electrical power generation plants, such as wind power plants, photovoltaic plants or power-heat coupling plants, in energy storage plants, such as, for example, compressed air storage power plants, battery storage power plants, flywheel accumulators, pumped storages or similar systems. A further option for use of the electric drive system 30 of FIGS. 2 and 3 is in passenger vessels or commercial transport vessels which are designed to move on or under the water, for example ships, motor boats or something similar.

The invention claimed is:

1. An electric drive system (30), comprising:
    an n-phase electric machine (6), n>1, having at least two multiphase winding strands (6a, 6b);
    a first inverter (3a), output connections of which are connected to the phase connections of a first of the multiphase winding strands (6a, 6b) of the electric machine (6);
    a second inverter (3b), the output connections of which are connected to the phase connections of a second of the multiphase winding strands (6a, 6b) of the electric machine (6);
    a DC voltage source (1), which has a plurality of battery modules (5) connected in series and a first output connection of which is connected to a first input connection of the first inverter (3a) and a second output connection of which is connected to the first input connection of the second inverter (3b); and
    a first DC voltage intermediate circuit (2a) connected to the first input connection of the first inverter (3a) and to a second input connection of the first inverter (3a),
    wherein the second input connection of the first inverter (3a) and a second input connection of the second inverter (3b) are connected to each other such that the first inverter (3a) and the second inverter (3b) are arranged in a series circuit, and
    wherein the second input connection of the first inverter (3a) and the second input connection of the second inverter (3b) are connected to a center tap (M) of the DC voltage source (1) between two sub-groups of the battery modules (5) connected in series.

2. The electric drive system (30) according to claim 1, wherein the first and the second inverter (3a, 3b) each comprise a three-phase, self-piloted inverter, which includes three symmetrical half bridges each including two power semiconductor switches (H1, H2; H3, H4; H5, H6) in a series circuit.

3. The electric drive system (30) according to claim 2, wherein the power semiconductor switches (H1, H2; H3, H4; H5, H6) are MOSFET switches or IGBT switches.

4. The electric drive system (30) according to claim 2, further comprising:
    a control device configured to actuate the power semiconductor switches (H1, H2; H3, H4; H5, H6) of the first inverter (3a) and the second inverter (3b),
    wherein the control device is disposed on a central control circuit board for the first inverter (3a) and the second inverter (3b).

5. An electric drive system (30) comprising:
    an n-phase electric machine (6), n>1, having at least two multiphase winding strands (6a, 6b);
    a first inverter (3a), output connections of which are connected to the phase connections of a first of the multiphase winding strands (6a, 6b) of the electric machine (6);
    a second inverter (3b), the output connections of which are connected to the phase connections of a second of the multiphase winding strands (6a, 6b) of the electric machine (6);
    a DC voltage source (1), which has a plurality of battery modules (5) connected in series and a first output connection of which is connected to a first input connection of the first inverter (3a) and a second output connection of which is connected to the first input connection of the second inverter (3b);
    at least one third inverter (3c) connected in parallel to the first inverter (3a), input connections of which are each coupled to input connections of the first inverter (3a); and
    at least one fourth inverter (3d) which is connected in parallel to the second inverter (3b) and the input connections of which are each coupled to input connections of the second inverter (3b),
    wherein a second input connection of the first inverter (3a) and a second input connection of the second inverter (3b) are connected to each other such that the first inverter (3a) and the second inverter (3b) are arranged in a series circuit, and
    wherein the second input connection of the first inverter (3a) and the second input connection of the second inverter (3b) are connected to a center tap (M) of the DC voltage source (1) between two sub-groups of the battery modules (5) connected in series.

6. The electric drive system (30) according to claim 5, wherein the first inverter, the second inverter, the third inverter and the fourth inverter (3a, 3b) each comprise a three-phase, self-piloted inverter, which includes three symmetrical half bridges each including two power semiconductor switches (H1, H2; H3, H4; H5, H6) in a series circuit.

7. The electric drive system (30) according to claim 6, wherein the power semiconductor switches (H1, H2; H3, H4; H5, H6) are MOSFET switches or IGBT switches.

8. The electric drive system (30) according to claim 7, further comprising:
    a control device configured to actuate the power semiconductor switches (H1, H2; H3, H4; H5, H6) of the first inverter (3a), the second inverter (3b), the third inverter (3c) and the fourth inverter (3d), wherein the control device is disposed on a central control circuit board for the first inverter (3a), the second inverter (3b), the third inverter (3c) and the fourth inverter (3d).

9. The electric drive system (30) according to claim 8, wherein the third invertor (3c) includes output connections connected to the phase connections of a third multiphase winding strand (6c) of the electric machine (6), wherein the fourth invertor (3d) includes output connections connected to the phase connections of a fourth multiphase winding strand (6d) of the electric machine (6), and wherein the n-phase electric machine (6) is a twelve-phase machine.

10. The electric drive system (30) according to claim 1, further comprising a second DC voltage intermediate circuit (2b) connected to the first input connection of the second inverter (3b) and to the second input connection of the second inverter (3b).

11. An electric drive system (30) comprising:
   an n-phase electric machine (6), n>1, having at least four multiphase winding strands (6a, 6b, 6c, 6d);
   a first inverter (3a), output connections of which are connected to the phase connections of a first of the multiphase winding strands (6a) of the electric machine (6);
   a second inverter (3b), output connections of which are connected to the phase connections of a second of the multiphase winding strands (6b) of the electric machine (6);
   a third inverter (3c), output connections of which are connected to the phase connections of a third of the multiphase winding strands (6c) of the electric machine (6);
   a fourth inverter (3d), output connections of which are connected to the phase connections of a fourth of the multiphase winding strands (6d) of the electric machine (6); and
   a DC voltage source (1), which has a plurality of battery modules (5) connected in series and a first output connection of which is connected to a first input connection of the first inverter (3a) and a first input connection of the third inverter (3c), and a second output connection of which is connected to the first input connection of the second inverter (3b) and a first input connection of the fourth inverter (3d)
   wherein the second input connection of the first inverter (3a) and the second input connection of the third inverter (3c) are connected to a first center tap (M) of the DC voltage source (1) between two sub-groups of the battery modules (5) connected in series.

12. The electric drive system (30) according to claim 11, wherein the second input connection of the second inverter (3b) and the second input connection of the fourth inverter (3d) are connected to a second center tap (M) of the DC voltage source (1) having a different voltage than the first center tap.

* * * * *